United States Patent [19]
Groh et al.

[11] 4,441,177
[45] Apr. 3, 1984

[54] STYLUS PROTECTION MECHANISM

[75] Inventors: Allen R. Groh, Buffalo Grove; Joseph D. Kehl, Chicago, both of Ill.

[73] Assignee: Shure Brothers, Inc., Evanston, Ill.

[21] Appl. No.: 433,985

[22] Filed: Oct. 12, 1982

Related U.S. Application Data

[63] Continuation of Ser. No. 154,087, May 28, 1980, abandoned.

[51] Int. Cl.³ .............................................. G11B 3/52
[52] U.S. Cl. .................................................. 369/170
[58] Field of Search .............................. 369/170, 256

[56] References Cited
U.S. PATENT DOCUMENTS

| 2,348,660 | 5/1944 | Stephan | 369/170 X |
| 2,502,242 | 3/1950 | Andres | 369/170 |
| 2,539,392 | 1/1951 | Ansar | 369/170 |
| 3,201,132 | 8/1965 | Hammond | 369/170 |

*Primary Examiner*—Charles E. Phillips
*Attorney, Agent, or Firm*—Allegretti, Newitt, Witcoff & McAndrews, Ltd.

[57] ABSTRACT

A phonograph stylus protection mechanism includes a protective zone defining member and a stylus deflector. The deflector moves the stylus to the protective zone during lateral deflection of the stylus to prevent stylus and record damage.

9 Claims, 8 Drawing Figures

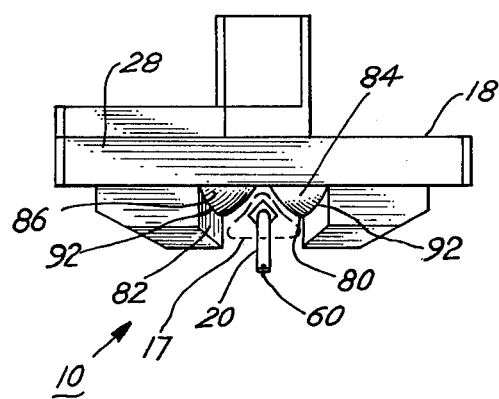
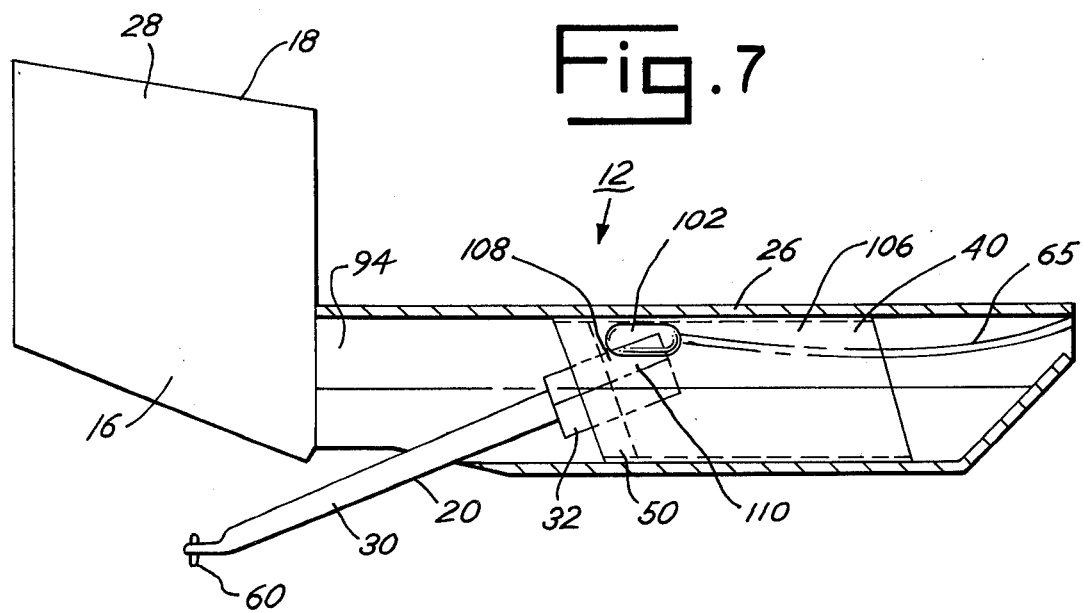

STYLUS PROTECTION MECHANISM

This is a continuation of application Ser. No. 154,087, filed May 28, 1980, now abandoned.

BACKGROUND OF THE INVENTION

This invention relates to a phonograph stylus, and more particularly, to a stylus protection mechanism for protecting the stylus and phonograph records against damage during lateral deflection of the stylus.

In the phonograph record player art, it has long been known that a major cause of damage to stylii and flat disc records is human operator error in the placement and removal of the stylii to and from the records. Through inattention, imprecision and excessive force, human operators err by striking stylii against record edges and grating stylii tips across recording surfaces. The consequent lateral deflections deform stylii shanks, break stylii tips and gouge recording surfaces. Stylii are often replaceable only at great expense, while records may be irreplacable. The knowledge of this cause of damage has spawned a variety of cueing devices which automatically and semi-automatically raise and lower stylii to and from the records. While these devices have proven highly useful, only the most sophisticated permit human operators to accurately select individual recordings from long-playing records. Also, most individuals have a propensity to disregard cueing devices and attempt to place or remove stylii manually. Thus, a dissatisfaction, and a need for a stylus protection mechanism that is automatically operable during manual cueing, have long existed.

SUMMARY OF THE INVENTION

It is thus an object of the present invention to provide a stylus protection mechanism for protecting the stylus of a phonograph cartridge.

Another object of the present invention is to provide a stylus protection mechanism for preventing damage to a stylus and a flat disc record which may be caused by human operator error in manual placement and removal, i.e., cueing, of the stylus to and from a record.

Another object of the present invention is to provide a stylus protection mechanism which provides stylus and record protection during manual placement and removal of a stylus to and from a record, unlike automatic and semi-automatic cueing devices.

Another object of the present invention is to provide a stylus protection mechanism which is readily adaptable to known stylii and phonograph cartridges.

Another object of the present invention is to provide a stylus protection mechanism which may be incorporated into a stylus assembly for ready replacement of a worn stylus assembly in a pre-existing cartridge.

Another object of the present invention is to provide a stylus protection mechanism that is ingeniously simple, economical of manufacture, and highly reliable.

To satisfy these and other objects and advantages, the present invention is, in principal aspect, a phonograph stylus protection mechanism in a stylus assembly. The mechanism comprises means on the assembly for defining a protective zone for the stylus, and means on the assembly for guiding the stylus to the protective zone during lateral deflection of the stylus. With such a mechanism, the stylus is protected from damage during lateral deflection caused by manual cueing error and the like. As preferred, the invention further comprises means on the assembly for supporting the stylus during movement to the protective zone, and means on the assembly for limiting the maximum lateral deflection of the stylus.

BRIEF DESCRIPTION OF THE DRAWING

Two preferred embodiments of the present invention are described in the Detailed Description of the Preferred Embodiments, which follows, with reference to the accompanying drawing. The drawing includes eight figures, briefly described as follows:

FIG. 3 is a schematic front elevation view similar to FIG. 2, schematically depicting a protective zone;

FIG. 7 is an inverted, schematic, cross-section view generally similar to FIG. 4 of the stylus assembly of FIG. 6, taken along line 7—7 in FIG. 6.

Figure 1:
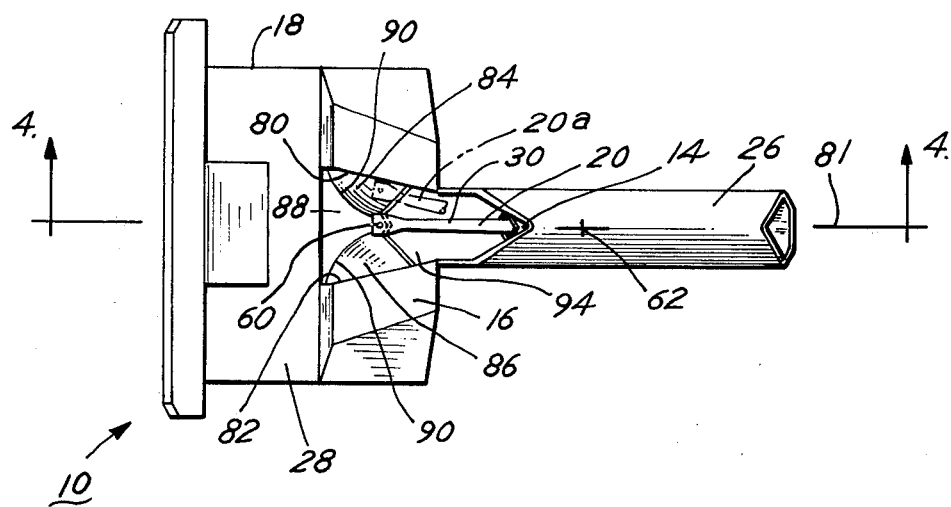
FIG. 1 is a bottom plan view of a stylus assembly provided with a first preferred embodiment of the present invention, including a break-away depiction of the stylus tip and shank as moved to a protective zone.

In the drawing, like reference numerals refer to like components in all the figures. In the Detailed Description, directional terms such as "right" and "left" are used in reference to the figures. Also, the terms "vertical", "horizontal" and the like are used, to relate the invention to the common flat disc record which spins about a vertical axis and defines a horizontal plane. Terms of this type are used for the convenience of the person of ordinary skill in the art, and are not to limit the scope of any patent issuing on the present invention, unless expressly included in the patent claims.

DETAILED DESCRIPTION OF THE PREFERRED EMBODIMENTS

Figure 4:
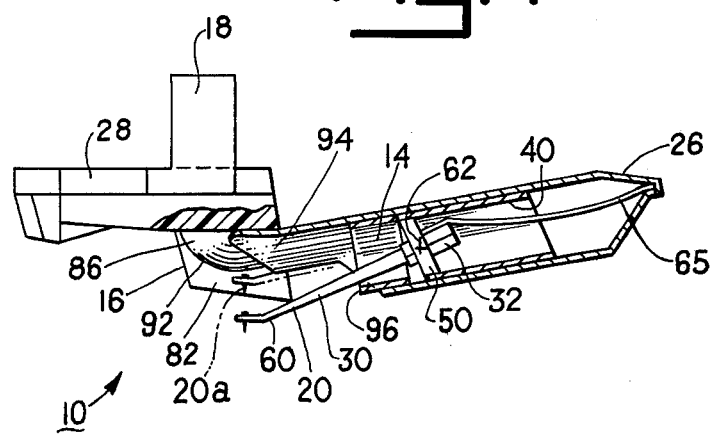
FIG. 4 is an inverted, cross-section view of the stylus assembly of FIG. 1, taken along line 4—4 of FIG. 1.
Figure 5:
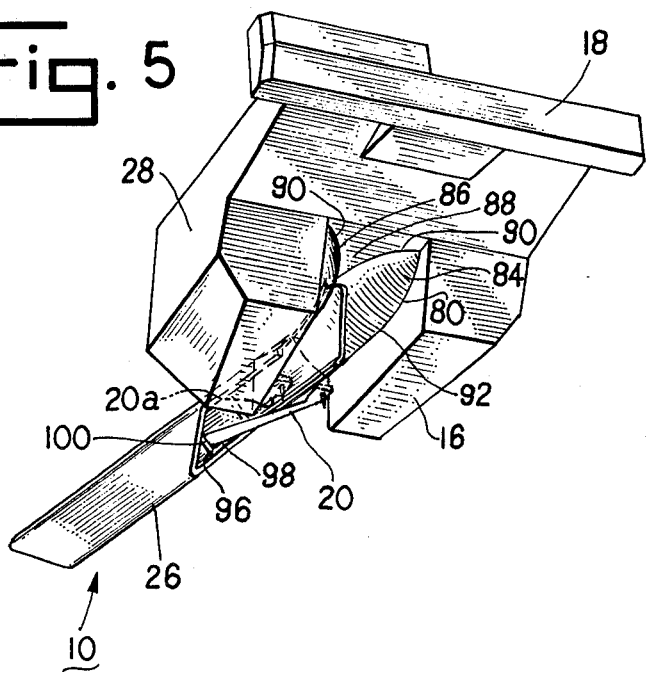
FIG. 5 is a bottom perspective view of the stylus assembly of FIG. 1.
Figure 6:
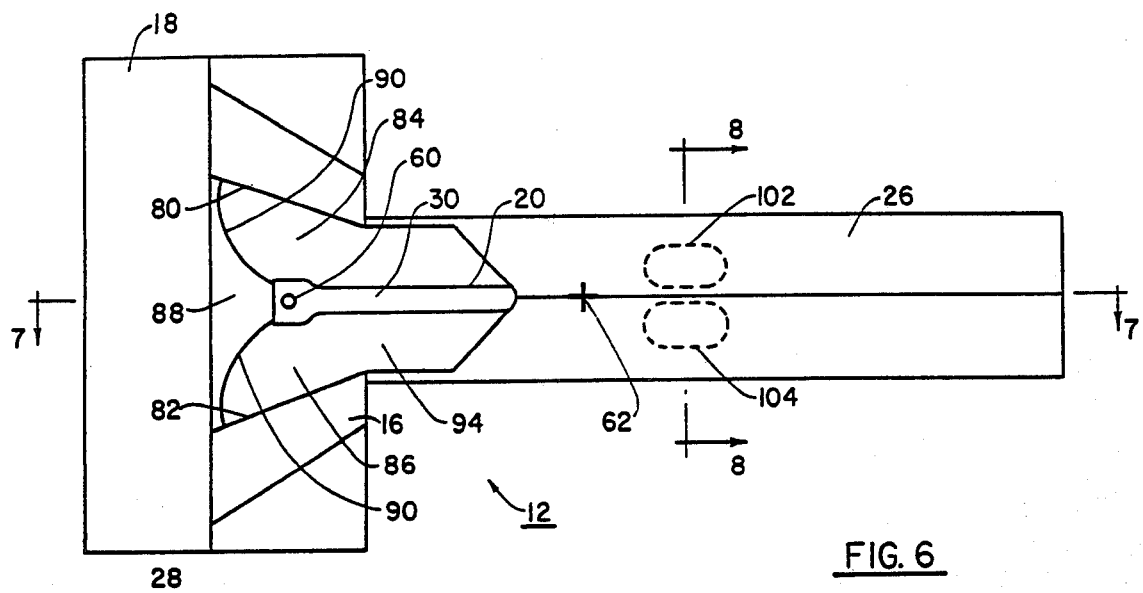
FIG. 6 is a schematic, bottom plan view of a stylus assembly provided with a second preferred embodiment of the present invention.
Figure 8:
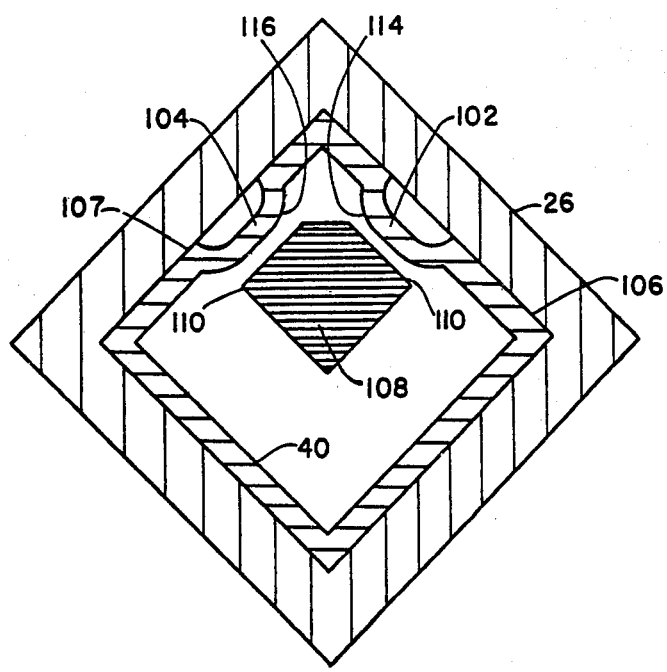
FIG. 8 is a schematic, cross-section view of the stylus assembly of FIG. 6, taken along lines 8—8 in FIGS. 6 and 7, and inverted from FIG. 6.

Referring to FIGS. 1-8 of the accompanying drawing, a first preferred embodiment of the present invention is a mechanism 10 shown in FIGS. 1-5, and a second preferred embodiment is a mechanism 12 shown in FIGS. 6-8. Mechanism 10 is regarded as the best mode of carrying out this invention.

Referring to FIGS. 1, 2, 4 and 5, the mechanism 10 includes a stylus deflecting sleeve 14 and a zone defining element 16. The element 16 constitutes means for defining a protective zone 17, as schematically shown in FIG. 3, for the tip 60 and shank 30 of the stylus 20. The deflecting sleeve 14 constitutes means for moving the stylus tip 60 and shank 30 to the protective zone 17, as will become apparent.

The mechanism 10 is provided in and a part of a stylus assembly 18. The assembly 18, other than the mechanism 10, and the cartridge (not shown) associated with the assembly 18 may be provided in a variety of configurations. One such configuration is described in detail in U.S. Pat. No. 4,194,744, issued on Mar. 25, 1980 to Allen R. Groh for a highly inventive Phonograph Pick-up Transducer Using A One-piece Bearing and Inertial Damper Fabricated From Different Materials. Another configuration is described in detail in U.S. patent application Ser. No. 100,420, filed on Dec. 5, 1979 by Joseph D. Kehl for a highly inventive lever Operated Stylus Guard For Phonograph Pick-Up Cartridge, and shown in ornamental detail in U.S. design patent application Ser. No. 929,553, filed on July 31, 1978 by Joseph D. Kehl et al. for a Phonograph Cartridge. U.S. Pat. No. 4,194,744 and U.S. patent application Ser. Nos. 100,420 and 929,553 are incorporated herein by reference.

As illustrated in FIG. 4, the stylus shank 30 extends from a magnet, or more generally, an armature 32. The armature 32 and stylus 20 are mounted within a stylus mounting sleeve 40 by a resilient bearing 50. This subassembly of the stylus 20, armature 32, bearing 50 and sleeve 40 is mounted inside a stylus housing 26. The bearing 50 and a spring wire 65 provide flexible movement of the stylus 20 and its tip 60 about a pivot point 62. The bearing 50 and the spring wire 65 constitute a means for providing an elastic return force to the stylus 20. As such, the bearing 50 and spring wire 65 are for returning the stylus tip 60 to an operating position as shown in FIGS. 1–5, from non-operating positions within and without the protective zone 17. The stylus housing 26 includes a stylus grip 28, for ease of handling the stylus assembly 18. A cartridge (not shown) receives the assembly 18.

The zone defining element 16 is integrally formed into the stylus grip 28 and the stylus housing 26. The element 16 includes, as in FIGS. 1 and 2, two limiting surfaces 80, 82 on the grip 28. The limiting surface 80 is to one side, the right side in FIGS. 2 and 3, and above the operating position of the stylus tip 60 while the limiting surface 83 is to the other side and likewise above the operating position. The limiting surfaces 80, 82 are vertical contact surfaces for the stylus 20 during extreme lateral, or side-to-side, deflection of the stylus 20. In the longitudinal, or front-to-back, direction of the stylus 20, along axis 81 in FIG. 1, the limiting surfaces 80, 82 extend at an angle toward the longitudinal axis of the shank to provide surface, as opposed to point, contact with the stylus 20. That is, the distance between the limiting surfaces 80, 82 widens as the distance between the pivot point 62 and points along the limiting surfaces 80, 82 increase. The lands 80, 82 are generally parallel to vertical surfaces extending through the pivot point 62, and to the edges of the stylus shank 30 adjacent the tip 60 when the stylus 20 is positioned as in the break-away views 20a of FIGS. 1, 2, 4 and 5. In the longitudinal direction, the limiting surfaces 80, 82 extend forward and in back of the tip 60. Thus, if the stylus 20 moves into contact with either limiting surface 80, 82, the edge of the stylus shank 30 adjacent the tip 60 is supported throughout its lengths 20a by the limiting surface as seen in the break-away view of FIGS. 1, 2, 4 and 5. As now apparent, maximum lateral deflections of the stylus 20 within the protective zone 17 are defined by the limiting surfaces 80, 82.

In addition to the limiting surfaces 80, 82, the zone defining element 16 includes two fillet surfaces 84, 86 and an upper, generally horizontal and generally flat surface 88. The surface 88 is hidden in FIG. 2 by the front of grip 28. As best seen in FIG. 1, the fillet surface 84 extends vertically upward and laterally inward from the land 80 to the upper surface 88. The fillet surface 86 extends vertically upward and laterally inward from the land 82 to the upper surface 88. The fillet surfaces 84, 86 are convexly rounded, and form curved junctures 90 with the upper surface 88. As in FIGS. 2 and 4, the fillet surfaces 84, 86 form curved junctures 92 with the lands 80, 82. The upper curved junctures 90 connect surface 88 with fillet surfaces 84 and 86. The lower curved junctures 92 connect surfaces 80 and 82 with fillet surfaces 84 and 86 respectively. Adjacent the forward portion 94 of the stylus housing 26, the fillet surfaces 84, 86 become the same shape and correspond to the contour of the portion 94, which generally forms an open, inverted, longitudinally tapering V, for surface contact by the stylus shank 30. The lines of juncture of the fillet surfaces 84, 86 and the stylus housing portion 94 are a matter of choice and are not shown in FIG. 3, for clarity. The rounding of the fillet surfaces 84, 86 provides for surface contact of the stylus shank 30 with the fillet surfaces 84, 86 and the stylus housing portion 94 when the stylus tip 60 contacts either fillet surface 84 or 86.

The limiting surfaces 80, 82, the fillet surface 84, 86, the upper surface 88 and the stylus housing portion 94 thus define the protective zone 17. The zone 17 is therefore three-dimensional, although only the front surface thereof is shown schematically in FIG. 3, for clarity.

Figure 2:
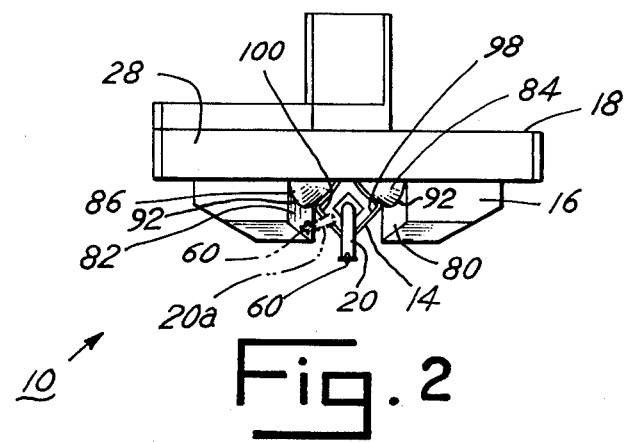
FIG. 2 is a front, elevation view of the assembly of FIG. 1.

The stylus deflecting sleeve 14 is square in cross-section and open-ended. As seen in FIGS. 2, 4 and 5, the sleeve 14 is "set on corner," or oriented with two opposite corners vertically aligned. A corner 96 is the lowermost corner of the sleeve 14. Two upwardly, outwardly angled deflection edges 98, 100 of the sleeve 14, best shown in FIG. 5, extend from the corner 96. The sleeve 14 is mounted in the stylus housing 26 adjacent and forward of the stylus mounting sleeve 40. The edges 98, 100 are adjacent the stylus shank 30, when the stylus 20 is in its operating position. Whenever the stylus 20 moves laterally from the operating position, the shank 30 contacts an edge 98, 100.

When lateral deflection presses the shank 30 against a deflector sleeve edge 98 or 100, further lateral deflection of the stylus 20 may occur only by movement of the shank 30 along the edge 98 or 100. The edges 98, 100 thus constitute a means for guiding the movement of the stylus 20 under lateral deflection thereof. By action of the shank 30 against the edges 98, 100, lateral deflection of the stylus 20 is accompanied by vertical deflection. The edges 98, 100, the limiting surfaces 80, 82 and the pivot point 62 are aligned so that the edges 98, 100 guide the stylus 20 into contact with the lands 80, 82. During movement of the stylus 20, the edges 98, 100 support the shank 30 to prevent deformation or damage.

Thus, during lateral deflection, the stylus shank 30 and tip 60 are raised, as in break-away views 20a of FIGS. 1, 2, 4 and 5, out of danger of damage to stylus or record, to the protective zone 17. As seen by comparing FIGS. 1 and 4 with FIGS. 2 and 5, movement to the protective zone 17 occurs with lateral deflection in both lateral directions. When the cause of lateral deflection has ended, the return force of the spring 65 and the bearing 50 return the stylus 20 to the operating position of FIGS. 1–5.

As most preferred, the sleeve 14 is a cut metal section of a square, hollow, thin-walled rod having an outer dimension substantially equal to the inner dimension of the housing 26. Also as most preferred, the housing 26 is metal and the grip 28 is a relatively hard, molded plastic material.

The second mechanism 12, as seen in FIGS. 6–8, operates as does the first mechanism 10, but includes two stylus deflecting projections 102, 104 in substitution for the stylus deflecting sleeve 14. The projections 102, 104 are stamped into the angled upper sidewalls 106, 107 of the mounting sleeve 40 adjacent the rearward extension 108 of the armature 32 past the bearing 50. The projections 102, 104 form inwardly directed, rounded deflection edges 114, 116, seen in FIG. 8, adjacent the angled sidewalls 110, 112 of the rearward extension 108. Lateral deflection of the stylus 20 causes an opposite lateral deflection of the extension 108 against the deflection edges 114, 116. The deflection edges 114, 116 guide the extension 108 downward as the extension 108 moves laterally, such that the projections 102, 104 guide the stylus shank 30 and tip 60 to the protective zone 17. Thus, the projections 102, 104 constitute a second type of means for guiding the stylus 20 to the protective zone 17.

As should now be apparent, the present invention, and the manner and process of making and using it, have been described in such full, clear, concise and exact terms as to enable any person skilled in the art to which it pertains, to make and use the same. Also, the best mode contemplated by the inventors of carrying out their invention has been set forth.

To particularly point out and distinctly claim the subject matter regarded as invention, the following claims conclude this specification. Where an element in a claim is expressed as a means for performing a specified function without the recital of structure, material or acts in support thereof, the claim shall be construed to cover the corresponding structure, material, or acts described in the specification and equivalents thereof.

What is claimed is:

1. A phonograph stylus protection mechanism in a stylus assembly having a stylus with a tip and a shank, the stylus being pivotably mounted to the assembly at a pivot point along the shank and being deflectable into and out of operating and non-operating positions by external forces, the mechanism comprising:
    a zone defining member on the assembly including limiting surfaces adjacent the operating position and defining a protective zone for the stylus in which the stylus is protected from external forces; and
    means on the assembly for guiding the stylus to the protective zone during lateral deflection of the stylus away from the operating position, the means including angled deflection edges positioned (1) to be physically contacted by the stylus during the lateral deflection and (2) to guide the stylus to the protective zone through the physical contact;
    whereby the stylus is protected from damage during lateral deflection.

2. A mechanism as claimed in claim 1 in which the stylus guiding means includes means for supporting the stylus during movement to the protective zone to prevent deformation of the stylus during lateral deflection.

3. A mechanism as claimed in claim 1 in which the zone defining member defines a raised protective zone at a distance above the operating position of the stylus, and in which the means for guiding the stylus constitutes means for raising the stylus to the raised protective zone.

4. A mechanism as claimed in claim 1 in which the limiting surfaces constitute means for limiting the lateral deflection of the stylus to a maximum lateral deflection.

5. A mechanism as claimed in claim 1 in which the means for guiding the stylus constitutes means for guiding the stylus to the protective zone during lateral deflection of the stylus in both lateral directions from an operating position.

6. A mechanism as claimed in claim 1 in which the stylus guiding means includes a stylus deflecting sleeve mounted on the stylus assembly so as to be contacted by the stylus upon lateral deflection from the operating position, the sleeve being adapted to deflect the stylus to the protective zone upon contact of the stylus with the stylus deflecting sleeve.

7. A mechanism as claimed in claim 6 in which the stylus deflecting sleeve includes a vertically angled deflection edge for vertically deflecting the stylus to the protective zone during horizontal deflection of the stylus and upon contact of the stylus with the angled deflection edge.

8. A mechanism as claimed in claim 1 in a stylus assembly having a stylus with a pivot point and an armature extending rearwardly from the pivot point, in which the stylus guiding means includes a stylus deflecting projection extending toward the armature for deflecting the stylus to the protective zone upon contact of the armature with the stylus deflecting projection.

9. A phonograph stylus deflection mechanism in a stylus assembly, the stylus assembly including a stylus with a stylus tip stylus tip edges and a stylus shank, an armature, a stylus mounting sleeve, a bearing, and a spring wire the armature being mounted on the stylus shank and within the bearing, the bearing being mounted within the stylus mounting sleeve, the stylus mounting sleeve being mounted within the stylus housing and the spring wire being mounted to the armature, with the stylus shank and tip extending longitudinally forward and downward out of the housing and sleeve to contact a flat disc record at an operating position and with the spring wire and bearing providing flexible lateral and vertical movement of the stylus about a pivot point about the operating position, the phonograph stylus deflection mechanism comprising:
    means on the assembly (a) for defining a vertical raised protective zone for the stylus and (b) for limiting the lateral deflection of the stylus tip to a maximum lateral deflection in each direction of lateral movement of the stylus from the operating position, said means including two opposed limiting surfaces above and laterally spaced from the operating position at the maximum lateral deflection adjacent the stylus tip, the limiting surfaces being longitudinally angled toward the pivot point to provide surface contact with the stylus shank edges adjacent the stylus tip; and
    means on the assembly (a) for guiding the stylus to the protective zone during lateral deflection of the stylus in both lateral directions from the operating position, and (b) for supporting the stylus during movement to the protective zone, said means including a stylus deflecting sleeve mounted within the stylus housing adjacent and longitudinally forward of the stylus mounting sleeve, the stylus deflecting sleeve including two opposed, vertically and laterally angled deflection edges positioned adjacent the stylus shank for upwardly deflecting the stylus to the protective zone upon contact of the stylus with the sleeve and supporting the shank during said deflection.

* * * * *